Patented Apr. 5, 1927.

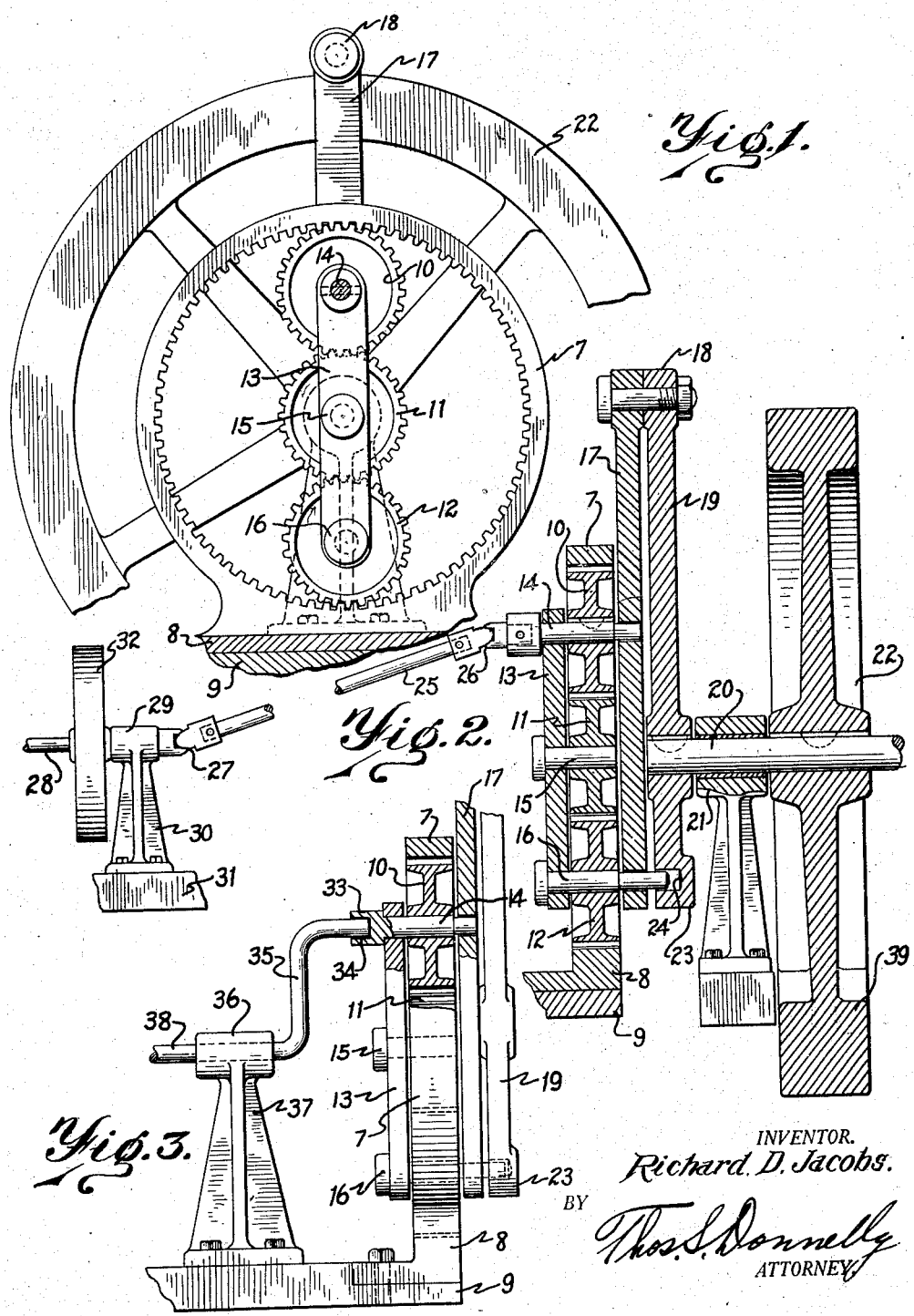

1,623,732

UNITED STATES PATENT OFFICE.

RICHARD D. JACOBS, OF DETROIT, MICHIGAN.

MECHANICAL MOVEMENT.

Application filed December 14, 1921. Serial No. 522,290.

My invention relates to a new and useful improvement in a mechanical movement and has for its object the provision of a mechanism whereby the power delivered by a machine may be transmitted in a highly modified state so as to materially increase the force exerted upon the machine to be operated or driven.

Another object of the invention is the provision of a mechanical movement employing a series of levers, some of which have moving fulcra, whereby a mechanical advantage may be derived.

Another object is the provision of mechanical movement which will provide a mechanical advantage and which will be simple in structure, economic of manufacture and highly efficient in use.

Other objects will appear hereinafter.

The invention consists in the combination and arrangement of parts hereinafter described and claimed.

The invention will be best understood by reference to the accompanying drawings which form a part of this specification and in which—

Fig. 1 is a fragmentary front elevational view,

Fig. 2 is a central vertical sectional view,

Fig. 3 is a fragmentary side elevational view of a modified form.

By the interposition of the invention between a machine and the source of power, the proper connections having been made, the force exerted upon the working machine is materially increased. This result is accomplished principally through the employment of levers and in my invention I employ preferably a number of levers some of which have moving fulcra.

The invention in its preferred form, comprises an internal gear 7 which is mounted upon a base 8, preferably made integral with the gear portion, said base 8 being mounted upon a supporting member 9. Positioned within the internal gear 7 are gears 10, 11 and 12, two of which mesh with the centrally positioned gear 11 and with the teeth on the internal gear. Extending from just beyond the center of the gear 10 to a point just beyond the center of the gear 12 is a bar or arm 13, through which extends the shaft 14 upon which the gear 10 is fixedly mounted. Extending through said arm is a shaft or pin 15 upon which the gear 11 is mounted, either loosely or fixedly. Extending through the arm 13 is a shaft or pin 16 upon which the gear 12 is mounted either loosely or fixedly.

The pin 14 projects through the gear 10 and into an opening formed in an arm or lever 17 which is positioned on the obverse side of the gears and in longitudinal alignment with the arm 13. The point at which the pin 14 projects through the lever 17 is at the longitudinal center thereof. The pin 16 projects through the said arm or lever adjacent one end. The opposite end of said lever is fastened by means of a bolt 18 to one end of a lever 19, the attachment of these levers being sufficiently loose to allow slight play between the same, although this is not essential. Through the lever 19, so as to lie in horizontal alignment with the pin 15, an opening is formed for receiving one end of the shaft 20 which is fixedly fastened to the lever 19. The shaft 20 is journaled in a suitable bearing 21 and is provided with a fly wheel 22. As shown the shaft 20 projects beyond the fly wheel 22 and is designed to be connected to the machine which is to be operated. The free end of the lever 19 is provided with an enlargement 23 having a pocket 24 formed therein for loosely receiving the end of the pin 16.

A shaft 25 is connected by a suitable universal joint to the pin 14 and by another suitable universal joint 27 to a shaft 28 mounted in a suitable bearing 29 supported by a standard 30 which is mounted upon a base 31. Fixedly mounted upon the shaft 28 is a fly wheel 32. The shaft 28 is designed to transmit the power from the source thereof so as to bring about a rotation of the gear 10. When the gear 10 is rotated force is transmitted to the gear 12 through the medium of the arm 13 and the gear 12, both together forming a lever fulcrumed at the center of the axis of the pin 16. At the same time force is transmitted to the lever 17 at the point where the pin 14 passes therethrough, the point of fulcrum of this lever being, so far as this force is concerned, at the axial center of the pin 18 passing through the lever. Another force is applied to the lever 17 by means of the pin 16 the fulcrum in this case also being at the axial center of the pin 18. Through the medium of the lever 17 and pin 16 force is applied to the lever 19 at two points, one being at the axial center of the pin 16 and the other being at the axial center of the bolt 18, the fulcrum of the lever, in both cases being at the axial center of the shaft 20. It is to be noted that for every revolution of the shaft 28 the gear 10 makes a revolution.

In Fig. 3 I have shown a modified form in which there is loosely positioned in a pocket 34 formed in the shoulder 33 one end of a crank 35, the horizontal portion of which is journaled in a bearing 36, the extended portion 38 of said member being designed for connection with the source of power. As shown in Fig. 2 the wheel 22 is counter balanced by the counter-weight 39, so as to compensate for the thrust of the levers 17 and 19.

It is thus seen that I have provided a mechanism which affords means for increasing the force which is delivered to the machine operated upon and which would be secured to the shaft 20. The simplicity and durability of the device is believed to be apparent.

While I have illustrated and described the preferred form of construction I do not wish to limit myself to the precise form of construction shown but desire to avail myself of such variations and modifications as come within the scope of the appended claims.

Having thus described my invention what I claim as new and desire to secure by Letters Patent is:

1. In combination an internal gear; a plurality of planetary gears co-operating therewith, each of said planetary gears being in mesh with an adjacent planetary gear; a bar connecting said planetary gears positioned on one side thereof to permit free rotation of said gears about their centers and the free travel of said gears around said internal gear; an elongated bar positioned on the opposite side of said planetary gears and connected thereto without disturbing the rotation or free travel of said gears, said bar being adapted for projecting beyond the periphery of said internal gear; a driving shaft; a fly wheel mounted on said driving shaft; an axle for each of said planetary gears; a bar connected fixedly, intermediate its ends, on said shaft, and connected at one end to the projecting end of said elongated bar, said bars projecting radially from said fly wheel shaft; a counterweight on said fly wheel, said counterweight being, relatively to said shaft, diametrically opposite to the relation of said bars to said shaft; and means for connecting to the axle of one of the outermost of said planetary gears a driven shaft.

2. A mechanism of the class described comprising: an internal gear; a plurality of planetary gears co-operating therewith, each of said planetary gears being in mesh with an adjacent planetary gear; a bar connecting said planetary gears positioned on one side thereof to permit free rotation of said gears about their centers and the free travel of said gears around said internal gear; an elongated bar positioned on the opposite side of said planetary gears and connected thereto without disturbing the rotation or free travel of said gears, said bar being adapted for projecting beyond the periphery of said internal gear; a driving shaft; a fly wheel mounted on said driving shaft; an axle for each of said planetary gears; a bar connected fixedly, intermediate its ends, on said shaft, and connected at one end to the projecting end of said elongated bar, said bars projecting radially from said shaft; a counterweight on said fly wheel, said counterweight being, relatively to said shaft, diametrically opposite to the relation of said bars to said shaft; said elongated arm being connected to two of the axles of said planetary gears, one of said axles connecting to said elongated bar adjacent its end and the other intermediate its ends, said axle connected to said bar intermediate its ends being adapted for attachment to a driven shaft.

In testimony whereof I have signed the foregoing specification at Detroit, Wayne County, Michigan.

RICHARD D. JACOBS.